(12) United States Patent
Barton et al.

(10) Patent No.: US 6,913,145 B2
(45) Date of Patent: Jul. 5, 2005

(54) WELDING WIRE CONTAINER WITH RIBBED WALLS AND A MATING RETAINER RING

(75) Inventors: David J. Barton, Twinsburg, OH (US); Christopher Hsu, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 85 days.

(21) Appl. No.: 10/413,492

(22) Filed: Apr. 15, 2003

(65) Prior Publication Data

US 2004/0206652 A1 Oct. 21, 2004

(51) Int. Cl.7 ....................... B65D 85/676; B65H 49/00
(52) U.S. Cl. ...................... 206/409; 242/129; 242/171
(58) Field of Search .................. 206/389, 407, 206/408, 409, 413, 414, 415, 702; 242/129, 137, 170, 171, 601

(56) References Cited

U.S. PATENT DOCUMENTS

| | | | |
|---|---|---|---|
| 1,640,368 A | | 8/1927 | Obetz et al. |
| 2,713,938 A | * | 7/1955 | Snyder ........................ 206/395 |
| 2,724,538 A | | 11/1955 | Schweich |
| 2,869,719 A | * | 1/1959 | Hubbard ...................... 206/599 |
| 2,929,496 A | | 3/1960 | Muehlebach et al. |
| 2,974,850 A | | 3/1961 | Mayer |
| 3,244,347 A | | 4/1966 | Jenk |
| 3,491,876 A | | 1/1970 | Zecchin |
| 4,582,198 A | | 4/1986 | Ditton |
| 4,623,063 A | * | 11/1986 | Balkin ......................... 206/408 |
| 4,869,367 A | | 9/1989 | Kawasaki et al. |
| 5,078,269 A | | 1/1992 | Dekko et al. |
| 5,109,983 A | | 5/1992 | Malone et al. |
| 5,205,412 A | | 4/1993 | Krieg |
| 5,277,314 A | | 1/1994 | Cooper et al. |
| 5,494,160 A | | 2/1996 | Gelmetti |
| 5,553,810 A | * | 9/1996 | Bobeczko .................... 242/601 |
| 5,816,466 A | | 10/1998 | Seufer |
| 5,819,934 A | | 10/1998 | Cooper |
| 5,845,862 A | | 12/1998 | Cipriani |
| 6,648,141 B2 | * | 11/2003 | Land .......................... 206/408 |
| 6,745,899 B1 | * | 6/2004 | Barton ........................ 206/409 |

FOREIGN PATENT DOCUMENTS

| | | |
|---|---|---|
| EP | 1 057 751 A1 | 12/2000 |
| JP | 62-111872 | 5/1987 |
| WO | GB88/00488 | 12/1988 |
| WO | EP94/00493 | 9/1994 |

* cited by examiner

Primary Examiner—John A. Ricci
(74) Attorney, Agent, or Firm—Fay, Sharpe, Fagan, Minnich & McKee, LLP

(57) ABSTRACT

A package for containing and dispensing a coil of welding wire having a coil axis parallel to a package axis, a coil top transverse to the coil axis and radially inner and outer surfaces parallel to the coil axis. The welding wire package includes a container having a bottom and an outer wall structure extending upwardly from the bottom to a top edge, and the outer wall structure has inwardly and outwardly facing surfaces. The package further includes a plurality of ribs extending parallel to the package axis and positioned between the coil outer surface and the inwardly facing surface of the outer wall structure thereby forming gaps between the coil outer surface and the inwardly facing container surface. The welding wire package further including a retainer ring for controlling the dispensing of the welding wire. The retainer ring includes a ring body extending between an inner edge defining an inner opening and an outer peripheral edge, and the outer peripheral edge includes a plurality of projections each extending beyond the outer surface of the wire coil and over a portion of the gaps.

17 Claims, 9 Drawing Sheets

WELDING WIRE CONTAINER WITH RIBBED WALLS AND A MATING RETAINER RING

This invention relates to the art of dispensing wire and, more particularly, to a ribbed package for containing and dispensing large quantities of a continuous wire without tangling.

INCORPORATION BY REFERENCE

The present invention relates to feeding large quantities of a continuous wire from a container to a welding operation wherein the wire must be fed to the welding operation without tangling or interruption. Such containers are known in the art and are generally shown and described in Cooper U.S. Pat. No. 5,277,314; Cooper U.S. Pat. No. 5,819,934; Kawasaki U.S. Pat. No. 4,869,367; and Gelmetti U.S. Pat. No. 5,494,160. These patents are incorporated by reference herein as background information illustrating packages for containing and dispensing large quantities of wire. Further, these patents illustrate the importance of controlling the wire as it is being dispensed from the package to prevent tangling.

Seufer U.S. Pat. No. 5,816,466 illustrates the interaction between the wire package and the wire feeder which is part of the welding apparatus and is incorporated by reference herein as background information.

BACKGROUND OF THE INVENTION

The present invention is particularly applicable for use in connection with welding wire and, therefore, the invention will be described with particular reference to a package containing a large quantity of welding wire stored therein as a coil containing many convolutions formed in layers. However, the invention has broader applications and may be used with any type of wire or other wirelike materials.

It is, of course, well known that welding is an effective method of joining metal components. Further, it is well known that utilizing a welding wire as a consumable electrode in the welding process enhances the weld. Accordingly, it is desirous to package welding wire so that it can be cost effectively utilized. Furthermore, welding applications wherein large quantities of welding wire are consumed necessitate welding wire packages which contain large quantities of a continuous welding wire. As a result, large welding wire packages have been created for these applications which allow for a significant amount of welding run time before the operation must be shut down to restring a new package of welding wire. This is particularly important for automated or semi-automated welding operations.

Bulk packaging of MIG wire is gaining popularity in both automated and semi-automated welding applications due to the reduced down time necessary to change and restring a new package of welding wire. Further, it is important to have reliable wire payout or dispensing from the welding wire package without wire tangling or wire flip/wander. Each tangle can potentially shut down an entire manufacturing line and reduces production yield. In this respect, in order to work in connection with the wire feeder of the welder, the welding wire must be dispensed in a non-twisted, non-distorted and non-canted condition which produces a more uniform weld without human attention. It is well known that wire has a tendency to seek a predetermined natural condition which can adversely affect the welding process. Accordingly, the wire must be sufficiently controlled by the interaction between the welding wire package and the wire feeder.

Wood or plastic reels are one form of bulk packaging. While reel packaging has a low tendency of tangling, it can occupy a large amount of floor space and is not easily changed over due to the time necessary to set up the dereeler equipment. Furthermore, the welding wire on the reel is exposed to the environment of the manufacturing operation which is often dusty and/or dirty. Another disadvantage of the reel type container is that they must be a rigid structure to hold the weight of the wire and allow the wire to pivot about an axis. As a result, disposing of the spent wire reel is costly.

Drum or box wire packages have been developed which protect the welding wire from the manufacturing environment and which can be disposed of at a lesser cost. The welding wire is coiled into the drum or box package in a loosely wound wire stack or coil consisting of many convolutions of wire which are often not as structurally stable as the wire convolutions of the reeled wire. As a result, it is also important to control the wire within the package in addition to the payout of the wire from the package in order to reduce twisting, tangling or canting of the welding wire. This condition is worsened with larger welding wire packages which are favored in automated or semi-automated welding operations. Furthermore, abuse during shipping and handling of the soft drum or box container often disrupts the uniform spacing or stacking of each convolution in the wire stack. Therefore, while drum or box wire packages provide some advantages over reeled wire, they are more susceptible to tangling.

A retainer ring can be used to both hold down the upward springing effect of the wire convolutions and to help control the outflow of the welding wire from the packaging without introducing additional distortions in the welding wire. As stated above, the drum or box welding wire package houses a coil of welding wire having many layers of wire convolutions laid from the bottom to the top of the package. These convolutions include an inner diameter and an outer diameter wherein the inner diameter is substantially smaller than the outer diameter. The memory or natural cast of the wire causes constant force in the convolutions of wire which is directed outwardly such that the diameter of each convolution is under constant influence or force to widen. The outer wall or walls of the wire welding package prevent such widening. However, when the welding wire is dispensed from the package, the walls of the package lose their influence on the wire and the wire will attempt to assume its natural cast. This causes the portion of the wire which is being withdrawn from the package to loosen and tend to spring back into the package thereby interfering and possibly becoming tangled with other convolutions of wire. In addition, the natural cast and/or twist in the wire causes the convolutions of welding wire to spring upwardly. The retainer ring controls these conditions in several ways. The weight of the retainer ring prevents the convolutions of wire from springing upwardly and works in connection with the wire package to control the outward spreading effect of the convolutions of wire. The shape of the retainer ring helps control the payout or dispensing of the wire from the package.

The retainer ring is positioned on the top of the wire coil such that the weight of the ring counteracts the upward lifting force of the wire coils. In prior art packaging, the retainer ring, wire coil and container all had the same general shape. In wire drums, the welding wire is positioned in the drum such that the wire engages the inner drum wall around the entire drum. This packaging design makes the clearance between the retainer ring and the inside of the drum a critical dimension. If the clearance is too small, the retainer ring will not reliably fall as the height of the wire coil is reduced during wire dispensing. For one, if the retainer ring becomes misaligned with respect to the drum wall it can become jammed with the packaging. This condition can happen when the retainer ring is lifted on one side by the wire movement during payout, when the wire coil is not level, or when the ring itself is not flat. Another problem with this design is that due to the minimal clearance between the ring and the drum, the drum outer wall must be nearly a perfect cylinder or the retainer ring can become lodged by the imperfections. Imperfections in the drum outer wall can be caused by a manufacturing problem or damage during the shipment of the welding wire package. Furthermore, shrink wrapping the drum for the shipment can also cause distortions in the outer wall of the drum. As a result, the low clearance ring design causes a large amount of down time necessary to continuously free a jammed or hung-up ring.

In order to reduce the tendency of the retainer ring jamming within the welding wire package, the clearance between the peripheral edge of the retainer ring and the inner surface of the outer wall of the welding wire package has been increased in some prior art packages. This can virtually solve the jamming problem. However, in a large clearance ring design, the retainer ring does not completely cover the top of the wire coil. During payout, the wire convolutions on the top layer of the wire coil tend to move outwardly due to the natural cast of the wire thereby causing the wire convolutions to expand and extend out beyond the outer periphery of the ring. As a result, the wire convolutions can pop upwardly between the outer periphery of the retainer ring and the drum wall which can severely tangle the welding wire and cause significant down time. This condition is worsened by the fact that the welding wire, which is pulled from the center of the retaining ring, has a tendency to urge one side of the retainer ring outwardly against the drum wall. This shifting enlarges the gap along the back side of the retainer ring disadvantageously increasing the likelihood that one or more convolutions of wire may spring upwardly through the gap. This condition is called "back side tangle" and can damage the retainer ring. As can be appreciated, a damaged retainer ring which is tangled amongst several convolutions of wire can cause significant down time. Furthermore, the large clearance retainer ring design can also be influenced by imperfections in the drum outer wall configuration. Therefore, in order to reduce the tangle rate, it is also necessary to maintain strict controls over the configuration of the outer drum packaging.

In an effort to overcome these problems, prior art retainer rings were designed to utilize resilient members which engage the inner surface of the welding wire drum. This particular design allows the use of a large clearance retainer ring while still protecting the outer convolutions of the welding wire coil to prevent the wire convolutions from springing outside the peripheral edge of the retainer ring. However, the frictional engagement between the retainer ring and the inner container walls, introduced drag into the system which adversely reduces the downward force produced by the retainer ring. The drag produced by the flexible members can also adversely jam the retainer ring above the wire coil, thereby reducing its control on the wire payout. In order to overcome the retainer ring drag, the weight of the retainer ring is increased or separate weights must be used. Furthermore, this ring design is still influenced by imperfections or damage to the outer drum of the wire package. As can be appreciated, a dent in the drum which is engaged by one of the resilient members, can stop the downward travel of the retainer ring. Further, the flexible members can break or crack causing tangling of the welding wire.

As stated above, the ability to inexpensively dispose of the welding wire package is also important. While rigid package designs can be used to reduce the likelihood of shipping damage, reduce coil shifting during shipment, and enhance the stackability of the package, rigid packages are difficult and expensive to dispose of. In welding operations which consume significant quantities of welding wire, package designs which are easily movable without significant concern to outer package damage and which are inexpensive to dispose of can play a significant role in the support operations for the welding process.

SUMMARY OF THE INVENTION

In accordance with the present invention, provided is a welding wire package which includes an outer container and inwardly extending ribs between the outer container and the welding wire coil along with a retainer ring shaped to matingly receive the ribs such that the outwardly extending portions of the retainer ring extend radially beyond the outer diameter of the wire coil. By including the ribs, a ring design can be utilized which freely floats on top of the wire coil regardless of imperfections in the outer container and advantageously prevents convolutions of the coiled wire from springing outside of the retainer ring.

The ribs according to the present invention are preferably fixed relative to the outer container and extend parallel to the wire coil axis. A plurality of ribs are spaced around the interior of the outer container so that a generally uniform wall gap is produced between the inner surface of the container and the outer surface of the wire coil. The retainer ring according to the present invention includes outwardly extending portions and recess portions corresponding to the ribs such that as the retainer ring descends within the packaging, the ribs move through the recesses in the ring and the outer portions of the retainer ring extend out beyond the radially outermost portion of the coiled wire over the gap produced by the ribs. As a result, the retainer ring can without resistance descend into the package by its own weight while still effectively preventing the outer convolutions of wire from popping up about the peripheral edge of the retainer ring.

In accordance with another aspect of the present invention, the outer container is a drum and the ribs are circumferentially spaced about the inner surface of the drum. The ribs are fixed relative to the drum wall and extend from the bottom of the drum to above the top edge of the wire coil.

In accordance with a further aspect of the present invention, the retainer ring is an annular ring with a substantially circular outermost peripheral edge and which includes recesses corresponding with the position of the ribs.

In accordance with yet a further aspect of the present invention, the ribs are formed as part of the outer wall of the container.

In accordance with another aspect of the present invention, the outer container has a square cross-sectional configuration and further includes an octagonal inner container sized to fit tightly within the outer container. The plurality of ribs are positioned on the inwardly facing surface of the octagonal inner container.

In accordance with yet another aspect of the present invention, the outer packaging has a square cross-sectional configuration and the ribs are attached directly to the four inner surfaces of the outer container. The ribs can be shaped so that the distal end of each rib is substantially tangent to the outer surface of the wire coil.

In accordance with still another aspect of the present invention, the rib portions of the package are a part of a flexible liner which is easily positionable within the outer container. The flexible liner can be a flexible sheet of material which includes ribs either attached or molded thereto. Based on the size of the packaging, the liner is cut to fit within the container such that it fits a substantial portion of the inward surface of the outer container. The liner can then be attached to the container. By utilizing a flexible liner, the circumferential spacing between ribs is more easily maintained.

The primary object of the present invention is a provision of a welding wire package which allows the continuous and uninterrupted payout of a welding wire from the package smoothly and without tangling.

Another object is the provision of a welding wire package of the foregoing character that can be used even if the outer container includes imperfections due to manufacturing defects and/or minor damages during transportation.

Still another object is a provision of a welding wire package of the foregoing character which can be lightweight and disposable.

A further object is the provision of a welding wire package of the foregoing character which minimizes ring jamming while also preventing the convolutions of the wire coil from escaping beyond the outer peripheral edge of the retainer ring without the need of frictional interengagement with the inner surface of the outer container.

Yet a further object is the provision of a welding wire package of the foregoing character wherein an existing outer package can easily be converted to a ribbed package design according to the present invention.

Another object is the provision of a welding wire package of the foregoing character which utilizes components that are economical to manufacture, easy to use in the field and protect the welding wire.

BRIEF DESCRIPTION OF THE DRAWINGS

The foregoing objects, and others, will in part be obvious and in part be pointed out more fully hereinafter in conjunction with the written description of preferred embodiments of the present invention illustrated in the accompanying drawings in which.

DESCRIPTION OF PREFERRED EMBODIMENTS

Figure 1:
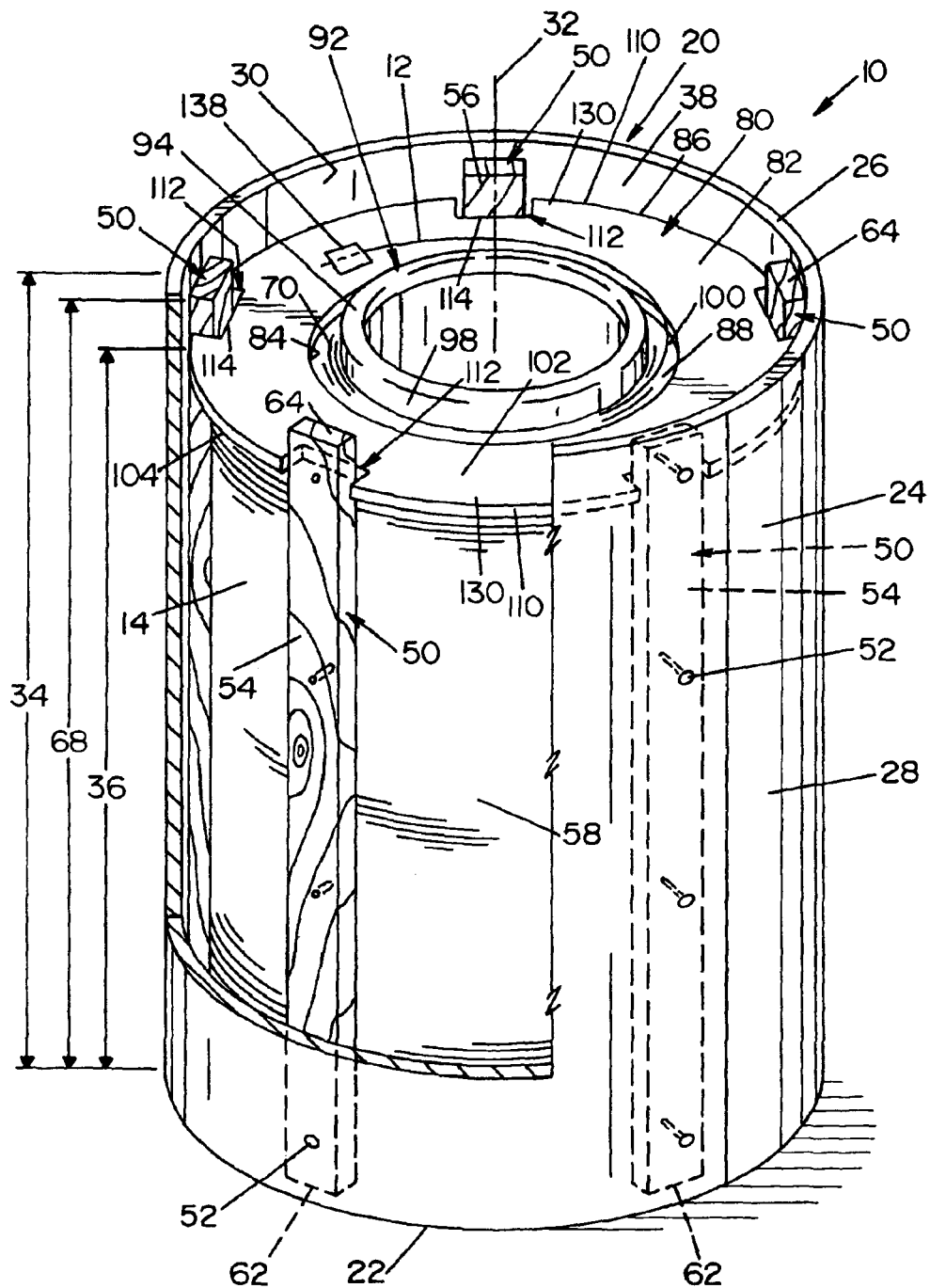
FIG. 1 is a partially sectioned perspective view of a welding wire package according to the present invention including a continuous strand of welding wire.
Figure 2:
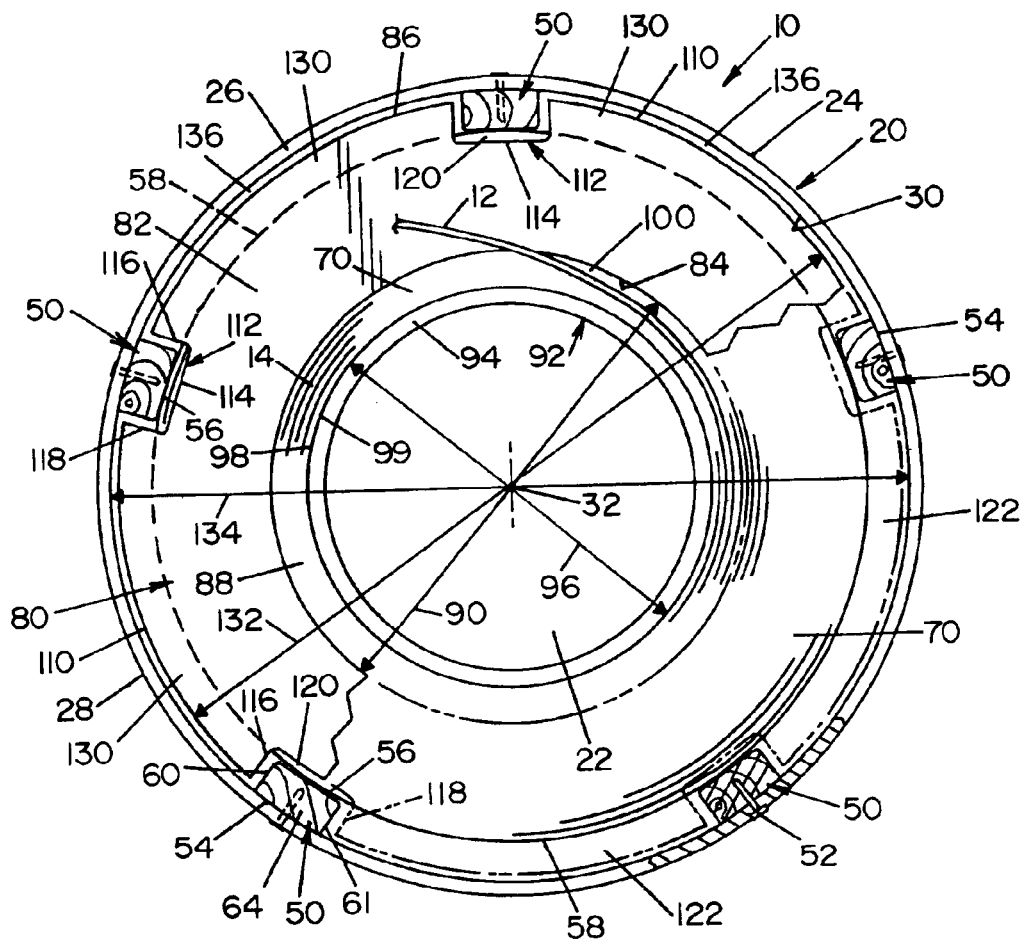
FIG. 2 is a partially sectioned top view of the welding wire package shown in FIG. 1.

Referring now in greater detail to the drawings wherein the showings are for the purpose of illustrating preferred embodiments of the invention only, and not for the purpose of limiting the invention, FIGS. 1 and 2 show a welding wire package 10 for containing and dispensing a continuous wire 12 of a wire coil 14. Package 10 includes a drum style carton or container 20 having a bottom 22 and a single outer wall 24 extending from bottom 22 to a top edge 26. As can be appreciated, drum 20 can be any type of drum know in the industry including fiber drums, plastic drums and/or sheet metal drums. Outer wall 24 has an outwardly facing surface 28 and an inwardly facing surface 30 and is substantially coaxial to a coil axis 32. Drum 20 is preferably a cardboard drum, however, the drum can be made from any suitable material known in the art. Outer wall 24 has a height 34 which is slightly greater than coil height 36. Drum 20 is shaped to receive wire coil 14 in a coil receiving recess 38. Package 10 further includes five vertically extending ribs 50 which are secured relative to outer wall 24 by fasteners 52. Ribs 50 are shown to be made from wood, however, they can be made from other materials known in the art which are capable of maintaining their dimension under the pressure of the coil of welding wire. While is preferred that at least five ribs are utilized, fewer or more can be used without departing from the invention. Ribs 50 each include an outer edge 54 juxtapose inwardly facing surface 30 of the outer wall and an inner edge 56 facing outer surface 58 of the wire coil. Ribs 50 further include sides 60 and 61, a bottom 62, and a top 64 and extend from the top surface of the drum bottom to slightly below top edge 26. However, ribs 50 have a height 68 which is greater than coil height 36 such that the ribs extend above coil top 70.

Package 10 further includes a retainer ring 80 having a ring body 82 extending between an inner edge 84 and a peripheral outer edge 86 thereby having generally an annular configuration. Inner edge 84 is circular defining an inner opening 88 having a diameter 90. Wire package 10 further includes an inner core 92 which is cylindrical and extends from the top surface of the drum bottom to a top edge 94 which is above coil top 70. Preferably, edge 94 is rounded to prevent damage to welding wire 12 as the wire is dispensed from the package. Inner core 92 further includes an outer surface 98 which is juxtapose to an inner coil edge 99 and which has an outer diameter 96 that is less than diameter 90 of the inner opening thereby forming a payout opening 100. The out flowing welding wire passes through payout opening 100 and is in part controlled by the engagement between the wire and inner edge 84, outer surface 98 and/or top edge 94. Retainer ring 80 has a top surface 102 and a bottom surface 104 which rests on coil top 70. As the wire is dispensed from package 10, coil top 70 descends in coil recess 38. Since ring 80 rests on coil top 70, the retainer ring follows the descent of coil top 70 within the coil receiving recess.

The retainer ring further controls the payout or dispensing of the welding wire by the configuration of peripheral edge 86. In this respect, edge 86 includes outermost edge portions 110 and recesses 112 circumferentially spaced about coil axis 32 and extending radially inwardly from edge portions 110. The embodiment shown in FIG. 2 includes rectangularly configured recess portions shaped to receive rectangular ribs 50. More particularly, each recess 112 includes a substantially flat base edge 114 and parallel side edges 116 and 118 which are transverse to base edge 114. The shape of edges 114, 116 and 118 are substantially the same as the shape of edges 54, 60 and 61, respectively. However, recess 112 is larger than rib 50 thereby forming rib gaps 120. Based on the winding process which produces wire coil 14, the inner edges of ribs 50 define outer surface 58 of the wire coil and gaps 122 are produced between each of ribs 50 and outer coil surface 58 and inner drum surface 30. Projections 130 extend radially outwardly from the package axis between adjacent recesses 112 toward inwardly facing drum surface and end at outermost edge portion 110. In this embodiment, the configuration of projections 130 together produce an outermost edge 110 which is substantially circular with a diameter 132 that is less than diameter 134 of inwardly facing surface 30. As stated above, the convolutions of wire, due to the natural cast of the wire, tend to move outwardly and upwardly unless they are contained by at least one component of the wire packaging. Therefore, there is a tendency of the wire convolutions to spring upwardly and outwardly of the peripheral edge of the retaining ring. As a result, prior art retainer rings maintained a tight tolerance between the outer peripheral edge of the ring and the inner surface of the drum or utilized flexible tabs. As can be appreciated, by utilizing the spaced ribs 50 within drum 20, gap 136 between outermost edge portion 110 and inner surface 30 can be sufficient enough to handle drum imperfections while being sufficiently radially outward of coil outer edge 58 to prevent the convolutions of wire from passing outwardly of the retainer ring. Further, retainer ring 80 is guided by ribs 50 as it descends downwardly in coil receiving recess 38. The engagement between the rib edges and/or inwardly facing surface 30 maintains the alignment of the retainer ring while allowing the retainer ring to freely float within coil receiving recess 38. Another advantage of this design is that the engagement between recesses 112 and ribs 50 prevent rotation of the retainer ring relative to the drum as the wire is being dispensed from packaging 10. By preventing rotation of retainer ring 80 relative to drum 20, the welding wire is dispensed from package 10 more smoothly and the retainer ring is less likely to jam within coil receiving recess 38. In addition, the engagement between the retainer ring and the ribs maintains the proper payout gap 100 between ring inner edge 84 and outer surface 98 of core 92.

During shipment of the welding package, retainer ring 80 can be secured relative to drum 20 by known techniques in the art. Further, wire 12 can be secured to any part of the container such as, for example, drum 20 or ring 80. FIG. 1 shows wire 12 being secured to retainer ring 80 by an adhesive fastener 138.

In the following discussions concerning other embodiments, the components of the welding wire package 10 which remain the same, as discussed above, will include the same reference numbers as above.

Figure 3:
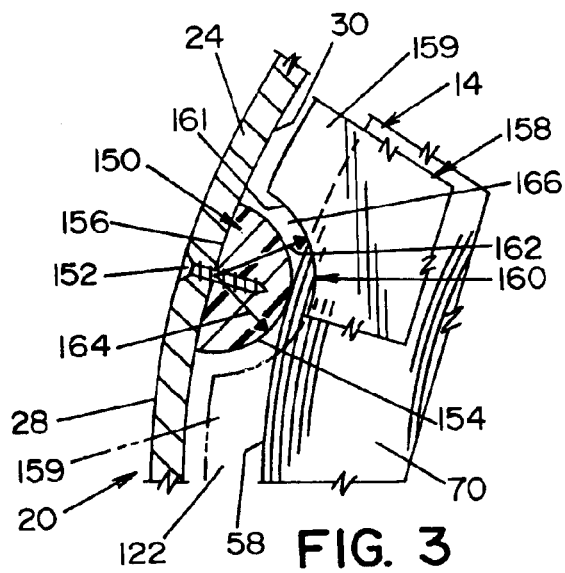
FIG. 3 is a sectional view of the welding wire package shown in FIG. 1 with a different style rib and corresponding retainer ring recess.

FIGS. 3, 4, 5, 6A, and 6B show different rib/recess configurations which can be utilized for one or all of the ribs which are circumferentially spaced within drum 20 without detracting from the invention. Further shown is different ways of securing the ribs relative to outer wall 24. With particular reference to FIG. 3, shown is a semi-circular rib 150 which is secured to outer wall 24 by screw fasteners 152. Rib 150 has an arcuate coil engaging edge 154 and a drum edge 156 conforming with the curvature of surface 30. By utilizing circular edge 154, rib 150 essentially makes point contact with each convolution of the wire coil. Turning to corresponding retainer ring 158, it will be appreciated that projections 159 extend between adjacent ribs 150 and that each recess 160 is an arcuate recess which has a semi-circular edge 161 having a radius 162 which is greater than rib radius 164 thereby forming an arcuate space 166 therebetween.

Figure 4:
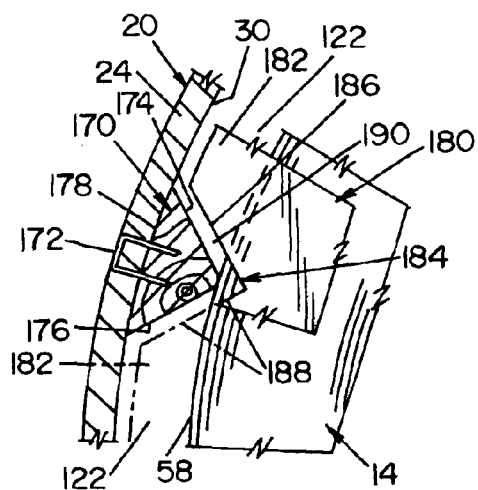
FIG. 4 is a sectional view of the welding wire package shown in FIG. 1 with another different style rib and corresponding retainer ring recess.

Referring to FIG. 4, shown is a triangular rib 170 which is attached to outer wall 24 by staple fasteners 172. Triangular rib 170 has a substantially triangular cross-sectional configuration with inner edges 174 and 176 and a drum edge 178. Triangular rib 170 also produces point contact with each convolution of wire of wire coil 14. Retainer ring 180 includes projections 182 which are between adjacent ribs 170, and V-shaped recesses 184 which receive a corresponding rib 170. Each V-shaped recess 184 is formed by edges 186 and 188 which are spaced from rib edges 174 and 176, respectively, thereby forming a V-shaped space 190 therebetween.

Figure 5:
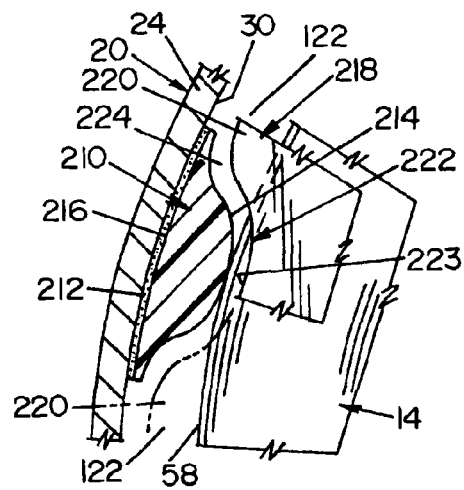
FIG. 5 is a sectional view of the welding wire package shown in FIG. 1 with yet another different style rib and corresponding retainer ring recess.

Referring to FIG. 5, shown is an arcuate rib 210 which is secured to drum surface 30 of outer wall 24 by an adhesive strip 212 and includes an inner edge 214 which is arcuate. Rib 210 further includes a drum edge 216 which is configured to conform with the curvature of surface 30. Arcuate edge 214 is a multi-radius arc whereby a drum edge 216 has a width that is larger than the width of the majority of the rib thereby providing additional surface area for the adhesive strip. Corresponding retainer ring 218 includes projections 220 which are between adjacent ribs 210 and recesses 222 between the projections and each having a recess edge 223. Edge 223 is arcuate and corresponds in contour with rib edge 214 but is larger than rib edge 214 thereby producing arcuate space 224 therebetween.

Figure 6A:
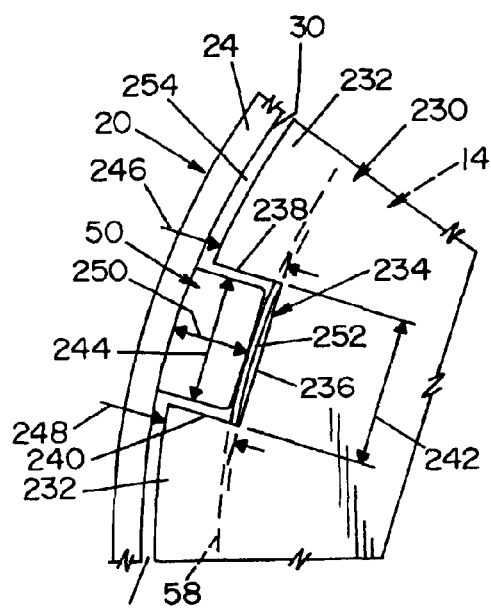
FIG. 6A is a sectional view of the welding wire package shown in FIG. 1 with a retainer recess closely configured to the corresponding rib.
Figure 6B:
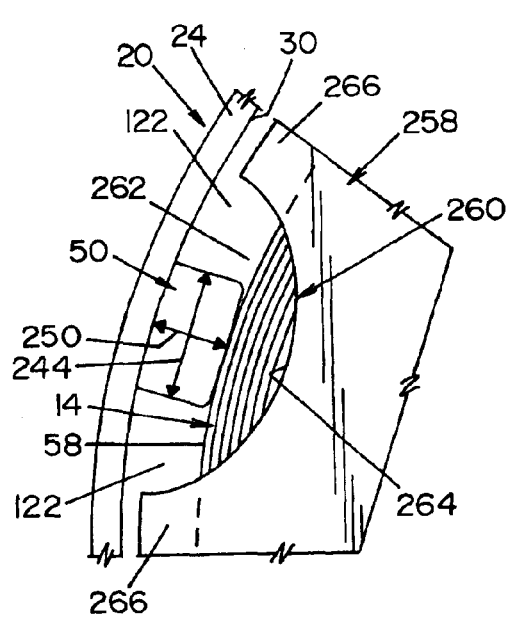
FIG. 6B is a sectional view of the welding wire package shown in FIG. 1 with a retainer recess loosely configured to the corresponding rib.

While FIGS. 3–5 show package designs which function essentially the same as the design shown in FIGS. 1 and 2, they show that different rib configurations can be used without departing from the invention. FIGS. 6A and 6B show that the spaces between the ribs and the corresponding recess can also vary as can the profiles of the ribs and recesses. In this respect, FIGS. 6A and 6B show rectangular ribs 50 which are the same as those shown in FIGS. 1 and 2; however, FIG. 6A shows a tighter spacing between the ribs and the rectangular retainer ring recess edge while FIG. 6B shows a looser spacing between the ribs and the recess edge. In addition, FIG. 6B shows a recess which is circular even though the rib is rectangular cross-sectionally. More particularly, FIG. 6A shows a retainer ring 230 having projections 232 and a rectangular recess 234. Recess 234 includes a base edge 236, a side edge 238, and a side edge 240 wherein base edge 236 has a width 242 which is only slightly greater than width 244 of rib 50. In similar fashion, side edges 238 and 240 have lengths 246 and 248, respectively, which are similar in length to thickness 250 of rib 50 such that spacing 252 is substantially the same as gap 254 between projection 234 and inner drum surface 30.

However, spacing 252 and gap 254 must be substantial enough to account for defects in or damage to outer wall 24. FIG. 6B shows rectangular rib 50 used in connection with a retainer ring 258 having an arcuate recess 260 and projections 266 and wherein space 262 between rib 50 and recess edge 264 is large. However, by providing a large space, it is important that ribs 50 extend sufficiently above coil top 70 to insure that one or more of the wire convolutions of coil 14 does not become lodged in space 262 during shipment or during the dispensing of wire 12. This is especially important during the dispensing of the beginning portion of wire 12.

Figure 7:
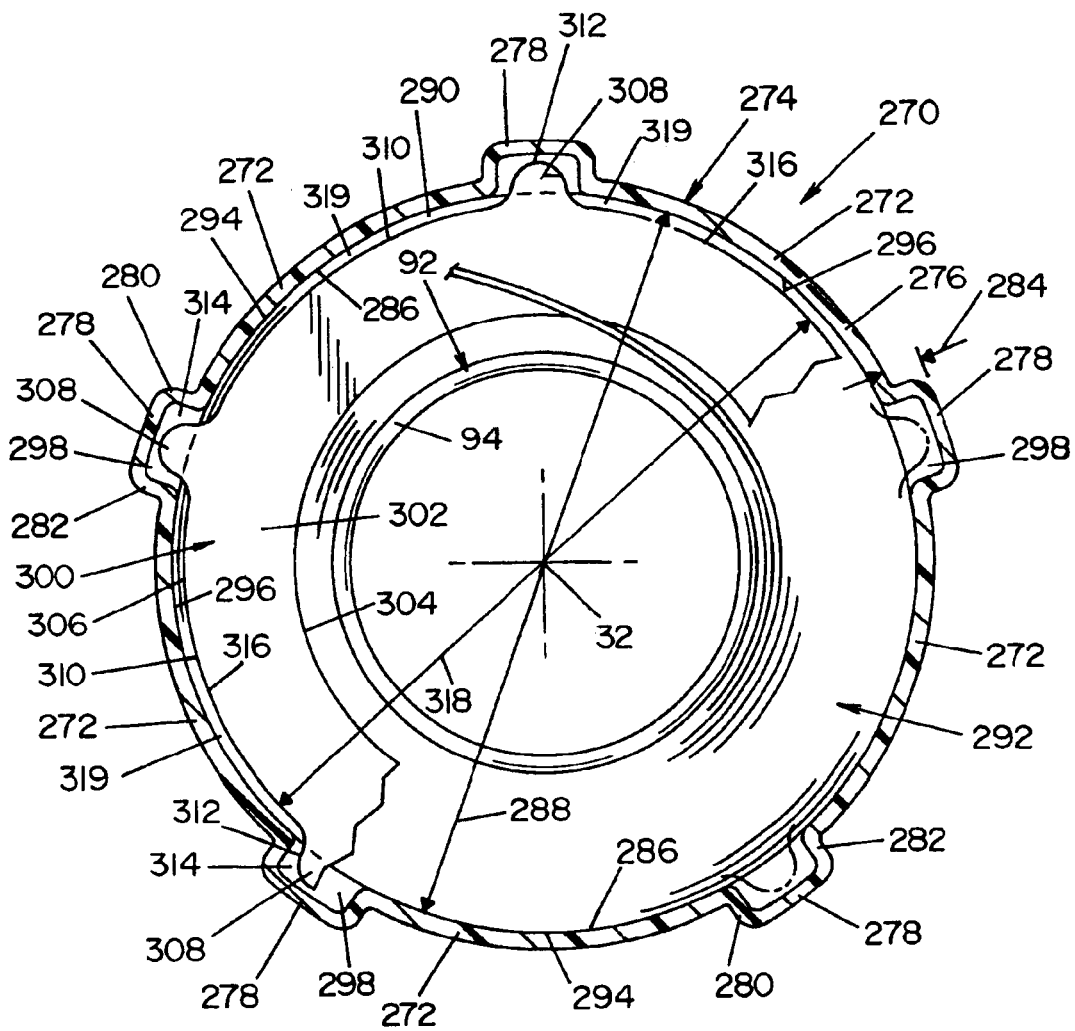
FIG. 7 is a partially sectioned top view of another embodiment of a welding wire package in accordance with the present invention.
Figure 8:
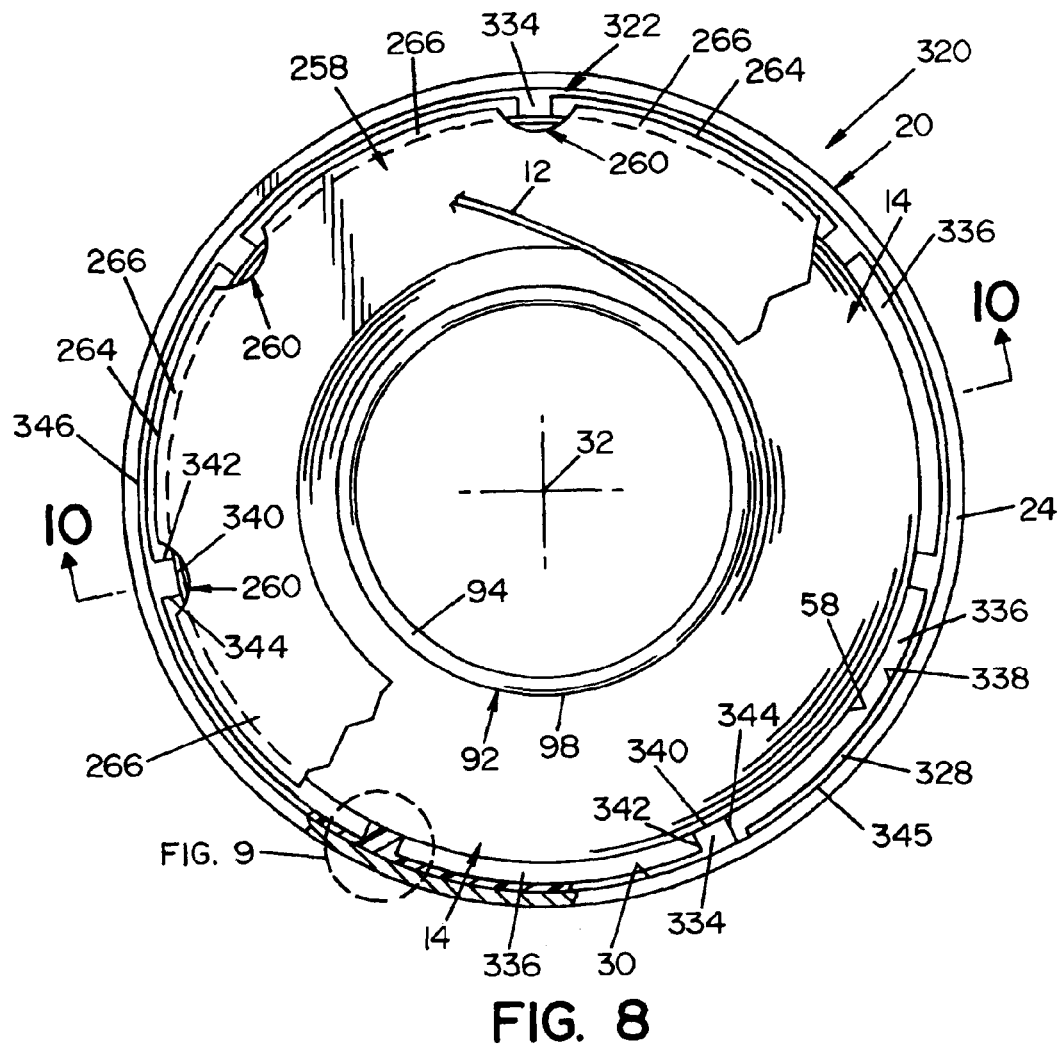
FIG. 8 is a partially sectioned top view of yet another embodiment of a welding wire package in accordance with the present invention.
Figure 9:
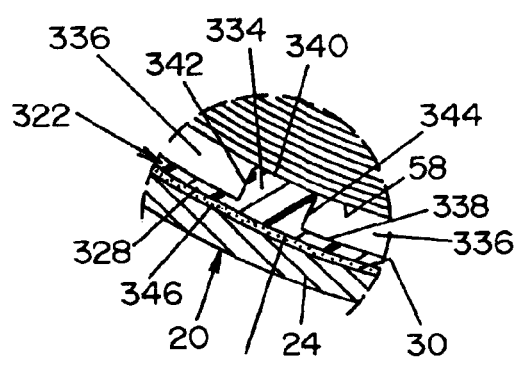
FIG. 9 is an enlarged view of one of the ribs shown in FIG. 8.
Figure 10:
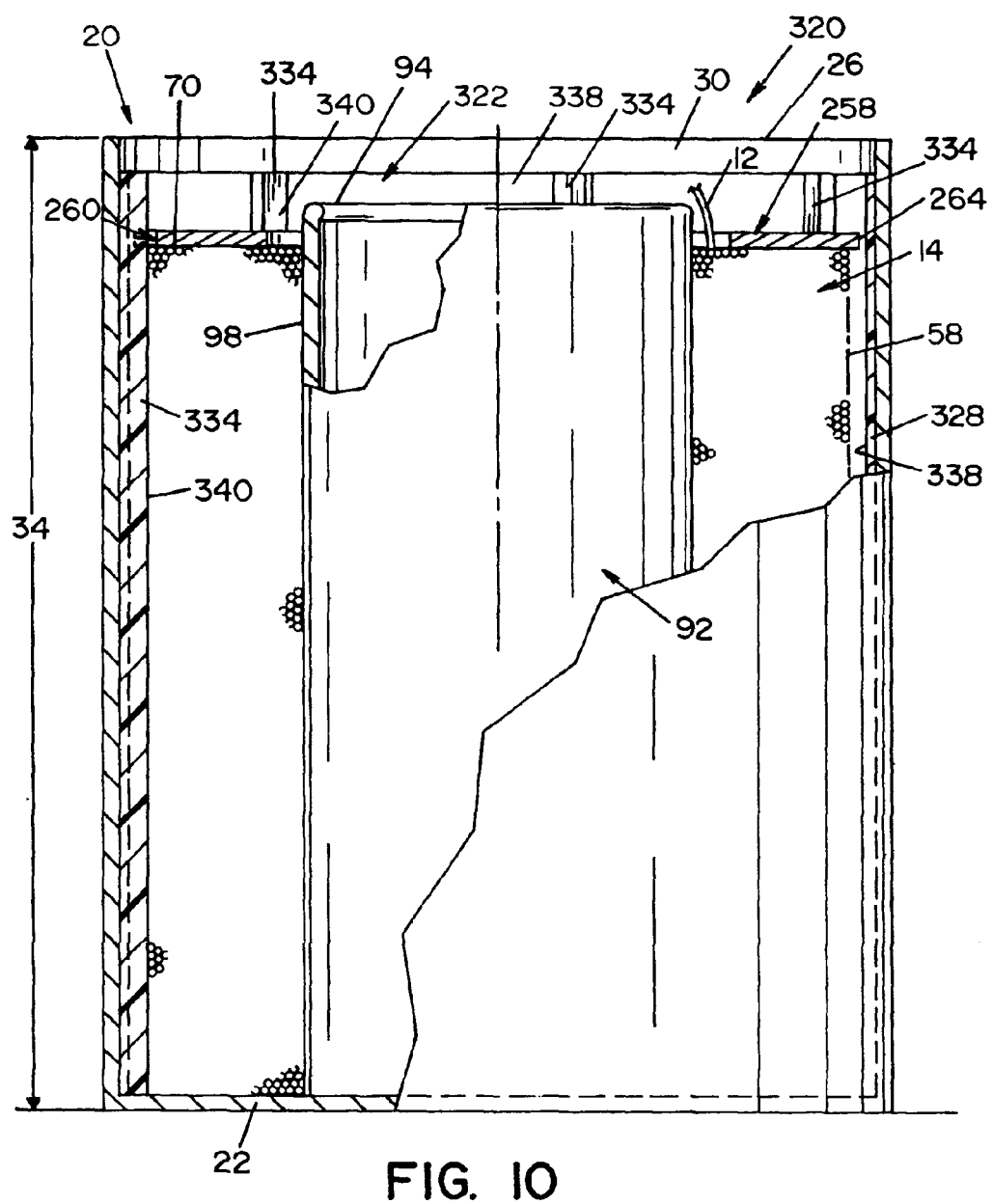
FIG. 10 is a sectional view taken along line 10—10 in FIG. 8.
Figure 11:
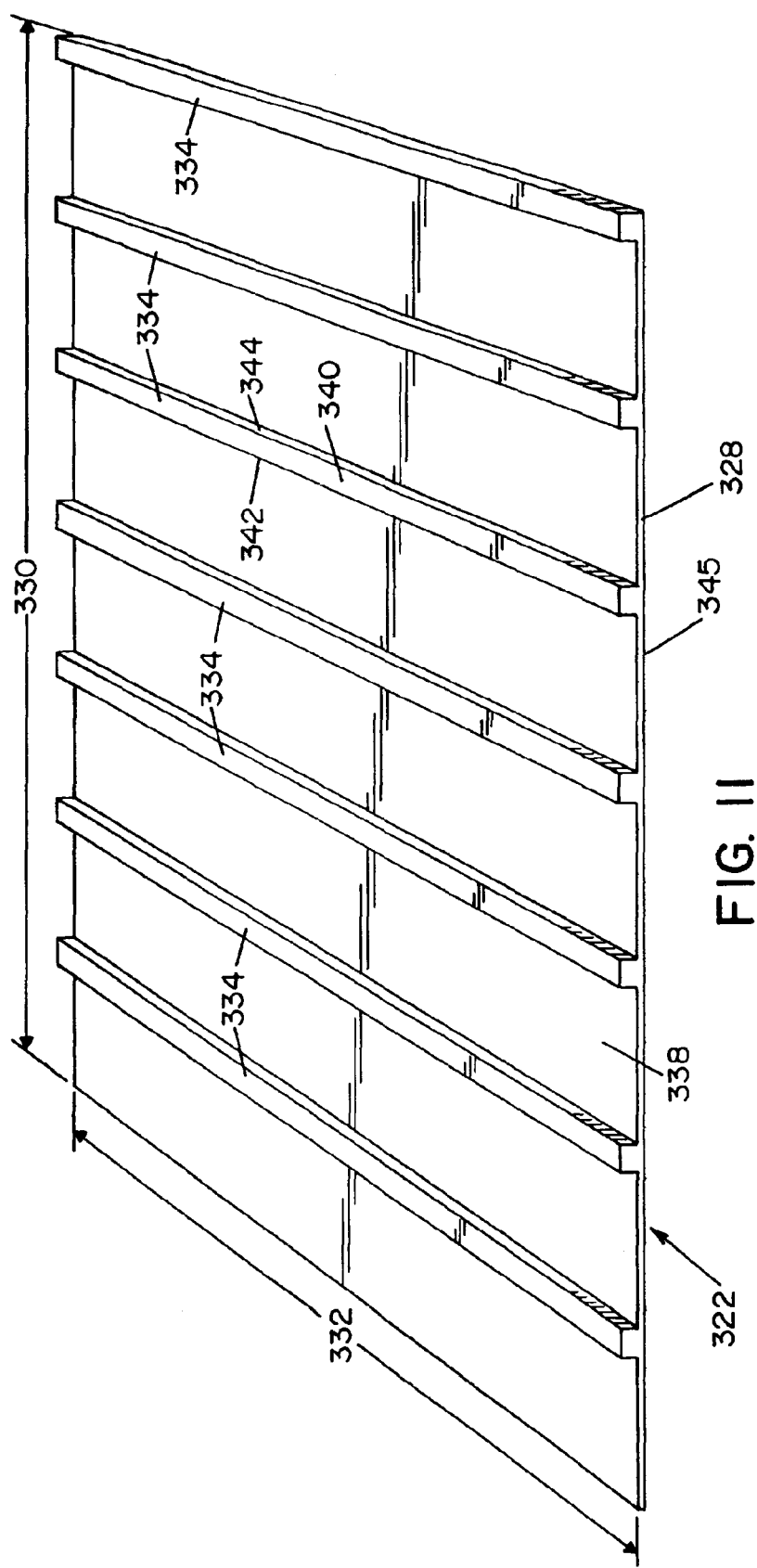
FIG. 11 is a perspective view of the ribbed liner for use in the welding wire package in FIG. 8 and wherein the ribbed liner is shown in a flat state.

Referring to FIG. 7, a wire package 270 is shown wherein ribs 272 are formed into the outer wall of the drum. In this respect, package 270 includes a drum 274 having an outer wall 276 which includes molded ribs 272 and molded outer portions 278 wherein outer portions 278 are joined to ribs 272 by connecting walls 280 and 282 each having a length 284. As can be appreciated, drum 274 can be any type of drum know in the industry including fiber drums, plastic drums and/or sheet metal drums. Ribs 272, outer portions 278 and connecting walls 280 and 282 are a single piece of material that can be molded, extruded rolled with a special die or made by other means know in the art. Ribs 272 have inward coil edges 286 which together are substantially cylindrical having a diameter 288. Since ribs 272 are molded into the outer carton, the ribs can be much wider circumferentially without adding significant cost or weight to package 270. Package 270 further includes a coil receiving recess 290 for receiving wire coil 292 having a radially outwardly facing edge 294 which engages inner surfaces 296 of ribs 272. Since outward edge 294 of coil 292 is maintained by surfaces 296, gaps 298 are formed adjacent to outer portions 278. Package 270 further includes a retainer ring 300 having a ring body 302 which extends between a circular ring inner edge 304 and a peripheral edge 306. Inner edge 304 is sized and functions as described above and therefore will not be discussed in detail in connection with this embodiment. Peripheral edge 306 includes projections 308 and recesses 310 between the projections. Projection edge portions 312 of peripheral edge 306 are arcuate and are sized to fit over gaps 298 such that there are spaces 314 between edge portions 312 and outer portions 278 and connecting walls 280 and 282. Ring recesses 310 have a circular edge 316 and together have a diameter 318 which is less than inward coil edges diameter 288 forming gaps 319. Gaps 319 along with spaces 314 allow retainer ring 300 to freely descend within coil receiving recess 290 as the wire is dispensed from package 270.

Referring to FIGS. 8–11, shown is a welding wire package 320 which includes a ribbed liner 322. Welding wire package 320 further includes retainer ring 258 having arcuate recesses 260 which are shown in FIG. 6B. Retainer ring 258 further includes projections to 266 having circular outer edges 264. Ribbed liner 322 is made from a flexible sheet of material with a planar base sheet 328 having a length 330 and a width 332. Liner 322 can be made from plastic, rubber, sheet metal sheet plastic and/or any flexible material know in the art and can be either molded, extruded, rolled with a special die or made by other means know in the art. Length 330 of sheet 328 corresponds with the circumference of inner surface 30 of drum 20 such that the ribbed liner extends about inner drum surface 30. Width 332 of the rib liner corresponding with drum height 34 such that ribs 334 extend sufficiently above coil top 70 to prevent the convolutions of wire coil 14 from becoming dislodged during shipment and/or the early stages of the dispensing of the wire from the package. Essentially, the function of ribs 334 and ring 258 are the same as those of ribs 50 and ring 80. However, liner 322 allows multiple ribs to be installed within drum 20 more quickly and more accurately. The primary difference is the fact that ribs 334 produce gaps 336 between outer surface 58 of coil 14 and sheet surface 338 of base sheet 328 instead of inner surface 30 of the drum outer wall 24. Ribs 334 are shown to have a rectangular cross-sectional configuration with an inner edge 340 and sides 342 and 344. It should be noted that the other rib configurations discussed above could also be used in connection with the ribbed liner. Ribbed liner 322 further includes a back surface 345 which can be adhesively secured to inner drum surface 30 by an adhesive 346. However, other fasteners know in the art could also be used to secure the liner to the drum.

Figure 12:
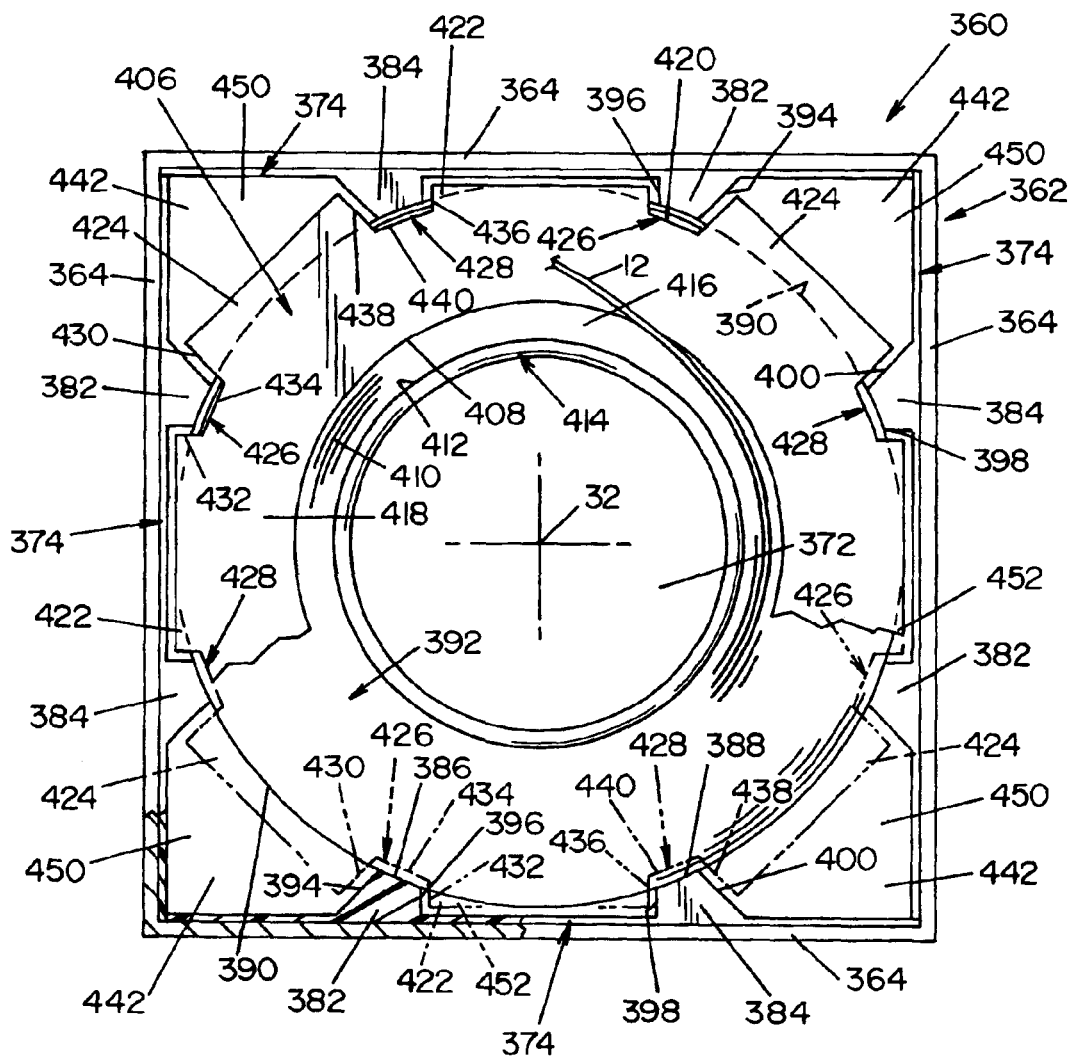
FIG. 12 is a partially sectioned top view of a further embodiment of a welding wire package in accordance with the present invention; and, FIG. 13 is a partially sectioned top view of yet a further embodiment of a welding wire package in accordance with the present invention.

Referring to FIG. 12, shown is welding wire package 360 having a square outer box 362 which has sides 364 and a bottom 372. While welding wire package 360 includes a top, it is not shown and any box top known in the art could be used. Welding wire package 360 includes four ribbed liners 374 each similar to ribbed liner 322. Liners 374 each include ribs 382 and 384 which are shown to have a trapezium cross-sectional configuration so that inner edges 386 and 388 are substantially tangent to a coil outer surface 390 of wire coil 392. However, it should be noted that other rib configurations, such as those described above, could be used in connection with package 360. Ribs 382 further include non-parallel side edges 394 and 396 and ribs 384 include non-parallel side edges 398 and 400. Package 360 has a retainer ring 406 which has an inner edge 408 forming inner opening 410 which is spaced from outer edge 412 of core 414 thereby producing a payout opening 416 used to dispense welding wire 12 from the wire coil. Payout opening 416 is similar to payout opening 100 discussed above and, therefore, will not be discussed in detail with respect to this embodiment. Retainer ring 406 further includes a ring body 418 and an outer peripheral edge 420 having projections 422 and 424 and recesses 426 and 428. Recesses 426 correspond with ribs 382 while recesses 428 correspond with ribs 384 in that recesses 426 include non-parallel sides 430 and 432 which are essentially parallel to non-parallel sides or edges 394 and 396, respectively. Recesses 426 further include a base 434 parallel to rib edge 386. In similar fashion, recesses 428 include non-parallel sides 436 and 438 which are parallel to rib sides 398 and 400, respectively. Recess 428 includes a base 440 parallel to rib outer surface 388 of rib 384. Projections 422 and 424 are essentially rectangular projections; however, projections 424 have a greater length than projections 422 in that projections 424 extend into one of box corners 442. Since ribs 382 and 384 maintain the outer coil surface in a spaced relationship to box sides 364, gaps 450 in box corners 442 are formed and gaps 452 along box sides 364 are formed. Projections 424 extend outwardly of coil outer surface 390 and partially cover gaps 450 while projections 422 extend beyond coil outer surface 390 and partially cover gaps 452.

Figure 13:
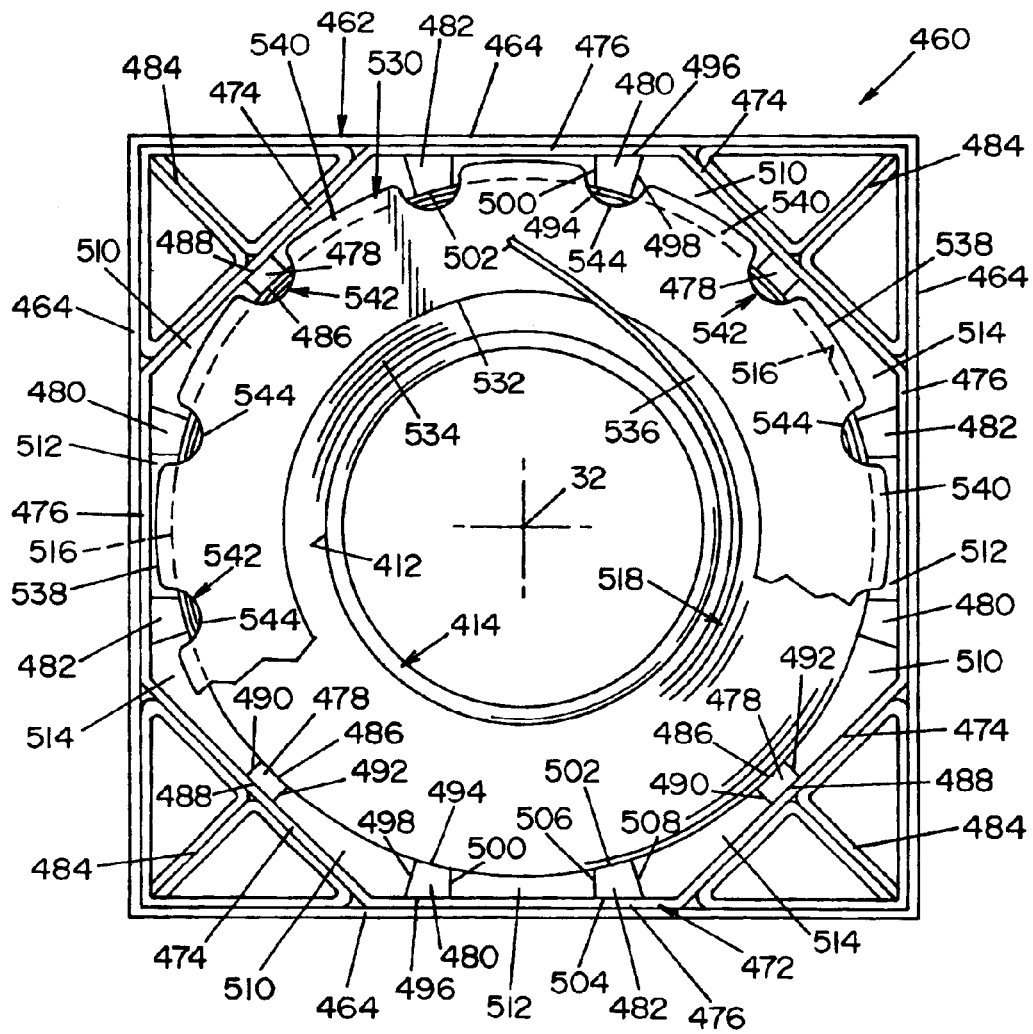

Referring to FIG. 13, shown is a welding wire package 460 having a square outer box carton 462 with sides 464 and an octagonal inner liner 472 having four sides 474 in opposed pairs and four sides 476 in opposed pairs. Sides 474 include ribs 478 and sides 476 include ribs 480 and 482. Welding wire package 460 further includes corner braces 484 positioned between the octagonal liner sides 474 and the corners of the carton. Ribs 478 have a rectangular cross-sectional configuration with a coil edge 486, a back edge 488 and parallel sides 490 and 492. Ribs 480 and 482 have a trapezium cross-sectional configuration wherein each rib 480 has a coil edge 494 which is non-parallel to a back edge 496 with non-parallel side edges 498 and 500 extending between the coil edge and the back edge. Each rib 482 includes a coil edge 502 which is non-parallel to a back edge 504 wherein non-parallel side edges 506 and 508 extend between the coil edge and the back edge. It should be noted that other rib configurations, such as those described above, could also be used in connection with package 460. Ribs 478, 480 and 482 produce gaps 510, 512 and 514 about the outer edge 516 of coil 518. Welding wire package 460 further includes a substantially annular retainer ring 530 having an inner edge 532 producing an inner opening 534 wherein inner edge 532 is spaced from outer surface 412 of core 414 which produces payout openings 536 similar to the payout opening discussed above. Retainer ring 530 further includes an outer peripheral edge 538 having projections 540 and recesses 542. Recesses 542 correspond with ribs 478, 480 and 482 and projections 540 extend radially outwardly beyond coil outer surface 516 and over gaps 510, 512 and 514. Recesses 542 are semi-circular recesses which provide a significant spacing between recess edge 544 and ribs 478, 480 and 482.

While considerable emphasis has been placed on the preferred embodiments of the invention illustrated and described herein, it will be appreciated that other embodiments can be made and that many changes can be made in the preferred embodiments without departing from the principals of the invention. Accordingly, it is to be distinctly understood that the foregoing descriptive matter is to be interpreted merely as illustrative of the invention and not as a limitation.

Having thus described the invention, it is so claimed:

1. A package for containing and dispensing a coil of welding wire, the coil having a coil axis parallel to a package axis, a coil top transverse to the coil axis and radially inner and outer surfaces parallel to the coil axis, said package comprising a container having a bottom and an outer wall structure extending upwardly from said bottom to a top edge, said outer wall having inwardly and outwardly facing surfaces; a plurality of ribs extending parallel to said package axis, each of said plurality of ribs including inner and outer edges and being positioned between the coil outer surface and said inwardly facing surface of said outer wall thereby forming gaps between said coil outer surface and said inwardly facing surface of said outer wall; and a retainer ring for controlling the dispensing of the welding wire which includes a ring body extending between an inner edge defining an inner opening and an outer peripheral edge, said outer edge including a plurality of projections each extending beyond the outer surface of the coil and over a portion of one of said gaps, said container is an outer container and has a square cross-sectional configuration, said package further including an octagonal inner container within said outer container, and said inner container including said plurality of ribs.

2. A package for containing and dispensing a coil of welding wire, the coil having a coil axis parallel to a package axis, a coil top transverse to the coil axis and radially inner and outer surfaces parallel to the coil axis, said package comprising a container having a bottom and an outer wall structure extending upwardly from said bottom to a top edge, said outer wall having inwardly and outwardly facing surfaces; a plurality of ribs extending parallel to said package axis, each of said plurality of ribs including inner and outer edges and being positioned between the coil outer surface and said inwardly facing surface of said outer wall thereby forming gaps between said coil outer surface and said inwardly facing surface of said outer wall; and a retainer ring for controlling the dispensing of the welding wire which includes a ring body extending between an inner edge defining an inner opening and an outer peripheral edge, said outer edge including a plurality of projections each extending beyond the outer surface of the coil and over a portion of one of said gaps, said container has a square cross-sectional configuration.

3. The package according to claim 2, wherein said plurality of ribs have a trapezium cross-sectional configuration.

4. A package for containing and dispensing a coil of welding wire, the coil having a coil axis parallel to a package axis, a coil top transverse to the coil axis and radially inner and outer surfaces parallel to the coil axis, said package comprising a container having a bottom and an outer wall structure extending upwardly from said bottom to a top edge, said outer wall having inwardly and outwardly facing surfaces; a plurality of ribs extending parallel to said package axis, each of said plurality of ribs including inner and outer edges and being positioned between the coil outer surface and said inwardly facing surface of said outer wall thereby forming gaps between said coil outer surface and said inwardly facing surface of said outer wall; a retainer ring for controlling the dispensing of the welding wire which includes a ring body extending between an inner edge defining an inner opening and an outer peripheral edge, said outer edge including a plurality of projections each extending beyond the outer surface of the coil and over a portion of one of said gaps, and a flexible liner which includes said plurality of ribs, said liner covering said inner surface of said outer wall.

5. The package according to claim 4, wherein said liner includes a planar body having a top edge, a bottom edge, side edges extending between said top and bottom edges, a first surface and an opposite second surface, said plurality of ribs extending along said first surface between said top and said bottom edges and each of said plurality of ribs having a distal edge spaced from said first surface, said liner being positioned between said inwardly facing surface of said outer wall and the radially outer surface of the coil such that said second surface engages said inwardly facing surface of said outer wall and said each distal edge engages the coil outer surface thereby forming gaps between the coil outer surface and said liner, said projections of said ring extending beyond the outer surface of the coil and over at least one of said gaps.

6. A liner for a package used to contain and dispense a coil of welding wire, the coil having a coil axis parallel to a package axis, a coil top transverse to the coil axis and radially inner and outer surfaces parallel to the coil axis, the package including a container having an outer wall structure coaxial with the coil axis and having an inwardly facing surface, said liner comprising at least one flexible planar body having a top edge, a bottom edge, side edges extending between said top and bottom edges, a first surface and an opposite second surface, said liner further including a plurality of ribs extending along said first surface substantially between said top and said bottom edges and each of said plurality of ribs each having a distal edge spaced from said first surface, said liner being positioned between said inwardly facing surface of the outer wall and the radially outer surface of the coil such that said second surface engages the inwardly facing surface of the outer wall and each said distal edge engages the coil outer surface thereby forming gaps between the coil outer surface and said first liner surface.

7. The liner according to claim 6, wherein the container is a drum and said at least one planar body is a single sheet.

8. The liner according to claim 7, wherein said plurality of ribs are at least five ribs equally spaced on said first surface such that said ribs are circumferentially spaced about the package axis.

9. The liner according to claim 6, wherein said each rib has a substantially rectangular cross-sectional configuration.

10. The liner according to claim 6, wherein the container has a square cross-sectional configuration and four walls having inner surfaces, said liner being positioned on the inner surfaces of the four walls.

11. The liner according to claim 10, wherein said at least one planar body is four planar bodies, one on each of said four walls.

12. The liner according to claim 6, wherein said container has a square cross-sectional configuration.

13. The liner according to claim 12, wherein said plurality of ribs have a trapezium cross-sectional configuration.

14. The liner according to claim 12, wherein said at least one liner body is four liner bodies.

15. A package for containing and dispensing a coil of welding wire, the coil having a coil axis parallel to a package axis, a coil top transverse to the coil axis and radially inner and outer surfaces parallel to the coil axis, said package comprising a container having a bottom and an outer wall structure extending upwardly from said bottom to atop edge, said outer wall having inwardly and outwardly facing surfaces and including a plurality of ribs formed therein extending parallel to said package axis such that said a first portion of said inwardly facing surface of said outer wall structure is spaced radially inwardly of a second portion of said inwardly facing surface, said first portion engaging the coil outer surface and forming gaps between said coil outer surface and said second portion of said inwardly facing surface of said outer wall.

16. The package according to claim 15, further including a retainer ring for controlling the dispensing of the welding wire which includes a ring body extending between an inner edge defining an inner opening and an outer peripheral edge, said outer edge including a plurality of projections each extending beyond the outer surface of the coil and over a portion of one of said gaps.

17. The package according to claim 15, wherein said plurality of ribs includes said first portion of said inwardly facing surface.

* * * * *